United States Patent
Barbulescu

(10) Patent No.: US 7,561,021 B2
(45) Date of Patent: Jul. 14, 2009

(54) IDENTIFICATION DEVICE FOR MOTOR VEHICLE

(75) Inventor: Virgile Barbulescu, Saint Aubin en Bray (FR)

(73) Assignee: Valeo Electronique, Creteil (FR)

( * ) Notice: Subject to any disclaimer, the term of this patent is extended or adjusted under 35 U.S.C. 154(b) by 603 days.

(21) Appl. No.: 10/482,967

(22) PCT Filed: Jul. 5, 2002

(86) PCT No.: PCT/EP02/07500

§ 371 (c)(1),
(2), (4) Date: Jan. 7, 2004

(87) PCT Pub. No.: WO03/006280

PCT Pub. Date: Jan. 23, 2003

(65) Prior Publication Data

US 2004/0164846 A1      Aug. 26, 2004

(30) Foreign Application Priority Data

Jul. 12, 2001    (FR) ................................. 01 09569

(51) Int. Cl.
*G06F 7/04* (2006.01)
(52) U.S. Cl. .................... 340/5.72; 340/5.1; 340/5.2; 340/5.7; 340/5.61; 340/5.6
(58) Field of Classification Search ................ 340/5.72, 340/5.64, 10.1, 5.1, 5.2, 5.6, 5.61, 5.7
See application file for complete search history.

(56) References Cited

U.S. PATENT DOCUMENTS

| 4,672,224 | A | * | 6/1987 | Low ............................ 307/10.4 |
| 4,914,283 | A | * | 4/1990 | Brinckmann et al. ...... 250/206.1 |
| 5,134,392 | A | * | 7/1992 | Takeuchi et al. ........... 340/5.62 |
| 5,339,048 | A | * | 8/1994 | Weber ......................... 330/302 |
| 5,744,874 | A | * | 4/1998 | Yoshida et al. .............. 307/10.1 |
| 6,072,436 | A | * | 6/2000 | Marougi ...................... 343/713 |
| 6,268,796 | B1 | * | 7/2001 | Gnadinger et al. ........ 340/572.5 |
| 6,323,566 | B1 | * | 11/2001 | Meier ......................... 307/10.2 |
| 2003/0053642 | A1 | * | 3/2003 | Bank et al. .................. 381/152 |
| 2005/0179323 | A1 | * | 8/2005 | Flick .......................... 307/10.6 |

FOREIGN PATENT DOCUMENTS

| EP | 0 570 761 | B1 | 11/1993 |
| EP | 1 001 117 | B1 | 5/2000 |
| FR | 2 785 703 | | 5/2000 |

* cited by examiner

*Primary Examiner*—Vernal U Brown
(74) *Attorney, Agent, or Firm*—Berenato, White & Stavish, LLC

(57) ABSTRACT

A device for identifying a motor vehicle comprising an identification unit carried by the user, a central onboard console (1) for verifying the user's identification data via an electromagnetic wave communication, through a resonant circuit having at least one tuning capacitor (13) and at least one coil transmitting/receiving (12) identification data; and at least one support module (10) comprising said transmission/reception coil and fitted at the vehicle door; said support module and said central console are spaced apart from each other and connected by electrical connection means; wherein the resonant circuit tuning capacitor is fitted in said support module (10) to limit parasitic radiation from the resonant circuit.

16 Claims, 2 Drawing Sheets

IDENTIFICATION DEVICE FOR MOTOR VEHICLE

The invention relates to an identification device, in particular of the "hands-free" type, for automobile vehicles.

In order to better appreciate the invention, it is helpful to present a known identification system and its disadvantages. FIG. 1 is a simplified diagram of an identification device comprising a central electrical console 1, generally located in the passenger compartment of the vehicle, and a support module 10 containing electronic components 11 and 12 that enable the central console 1 to communicate with an identification unit (not shown) such as a badge carried by a user. The support module 10 is mounted in a door handle or trunk of the vehicle and will be described in more detail below.

For reasons of clarity, only one support module 10 with its electric components 11 and 12 has been shown, but it is of course possible to equip every handle of the vehicle with such a module 10 that is connected to the single central electrical console 1.

As shown in FIG. 1, the central console 1 and the electric components 11 and 12 are connected by connection means 20, 22, 23, 24 generally pressed against the walls of the vehicle's passenger compartment.

Classically, the electronic components 11 and 12 in the support module 10 comprise an approach sensor 11 and a transmission/reception coil 12.

A microcontroller 3, an amplifier stage 5, a resistor 2, a tuning capacitor 13, a ground connection 4 and a battery connection 6 are fitted in the central console 1.

The microcontroller 3 generates identification data and verifies the authenticity of the identification data emitted by the badge. Hereinafter it will be referred to as the verification microcontroller.

The resistor 2, the tuning capacitor 13 and the transmission/reception coil 12 form a resonant circuit.

Classically, the resistor 2 and the tuning capacitor 13 of the circuit are mounted in the central console 1. The transmission/reception coil is mounted in the support module 10 such that its emission/reception field is localized at the handles of the vehicle.

The capacitor 13 is usually called a tuning capacitor since its capacitance value is defined such that the resonance frequency of the transmission/reception coil 12 is equal to the resonance frequency of the coil fitted in the badge carried by the user.

This tuning capacitor 13 ensures a high quality factor of the resonant circuit, which increases the emission/reception range of the coil 12.

The tuning capacitor has a capacitance of about ten nano-Farads to ensure a high tension, often about a hundred Volts, at its terminals at the working frequency.

Owing to the high tension on the electrical link between the console 1 and the module 10, and its length, parasitic radiation is generated which perturbs the field generated by the coil 12 and other vehicle systems.

The resonance frequency of the badge and the transmission/reception coil 12 must match in order for the badge to be able to receive the data sent by the coil 12. However the electrical link 20 induces an additional capacitance, parasitic, which modifies the operating frequency of the coil 12. Moreover, this parasitic capacitance has a value that depends on the geometry of the vehicle and is therefore difficult to control.

One known method of overcoming these disadvantages is to make the link between the support module 10 and the central console 1 using a twisted, screened cable 20.

However, this type of cable 20 is bulky, which is a disadvantage in view of the limited mounting space in the door. In a vehicle, numerous functions are performed by electric activators, and the electrical wiring must occupy as little space as possible in order to maximize the passenger compartment.

Moreover, a cable 20 of twisted, screened type costs much more than a simple twisted cable.

For these reasons, the object of the invention is to build an identification device including electrical links of small diameter, few in number and of low cost between the central console 1 and the support module 10.

For this purpose, the object of the invention is an identification device as defined in claim 1.

The device according to the invention can also have one or more of the following characteristics:

- the resonant circuit includes an adjusting capacitor, fitted in the central console, used for fine adjustment of the resonant circuit resonance frequency, to be able to take account of the geometry of each type of vehicle;
- the central console includes a verification microcontroller to verify said identification data, and the support module includes an approach sensor and an amplifier stage connected to the resonant circuit, said approach sensor including at least one electrode and a processing microcontroller that sends a triggering signal to said verification microcontroller, said processing microcontroller being connected to said verification microcontroller to also manage the sending of said identification data, by multiplexing on a common serial link, thereby reducing the number of wires between the support module and the central console;
- the central console includes a verification microcontroller to verify said identification data, and the support module includes an additional microcontroller, an amplifier stage and the resonant circuit connected together in series, said additional microcontroller being connected to said verification microcontroller to manage the sending of said identification data, by multiplexing on said common serial link, thereby reducing the number of wires between the support module and the central console.
- the device includes at least one closing control means, acting on a vehicle door and fitted on the support module, said control means including at least one electrode and a processing microcontroller that sends a door locking command signal;
- the processing microcontroller that sends a triggering signal is connected to said electrode to also manage the sending of a locking command signal, by multiplexing on said common serial link, thereby reducing the number of wires between the support module and the central console;
- the closing control means is a tactile sensor;
- the closing control means include a manually operated switch;
- the support module and the central console are connected by only one ground connection serving as ground for all the electronic components in said module, thereby reducing the number of wires between the support module and the central console;
- the support module and the central console are connected by only one power supply connection serving as power supply for all the electronic components in said module, thereby reducing the number of wires between the support module and the central console.

The invention will be better understood on reading the detailed description below of embodiments, which are non-limitative and taken only as examples, with reference to the attached drawings of which:

FIG. 2 shows an identification device according to a first embodiment of the invention. The items identical to those in FIG. 1 carry the same reference numbers.

Figure 1:
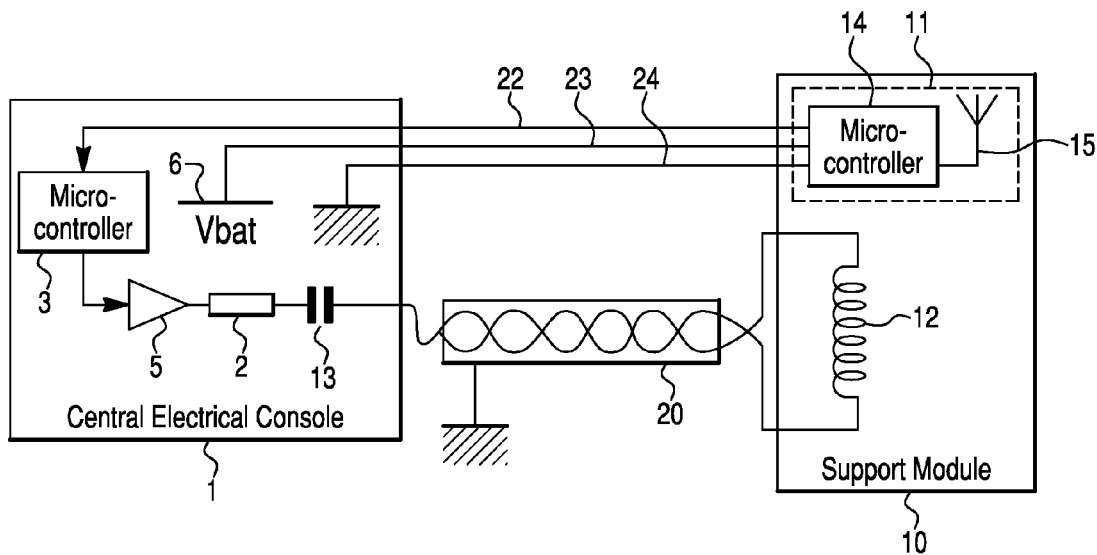
FIG. 1 is a schematic diagram of an identification device according to the prior art (described in the preface)
Figure 2:
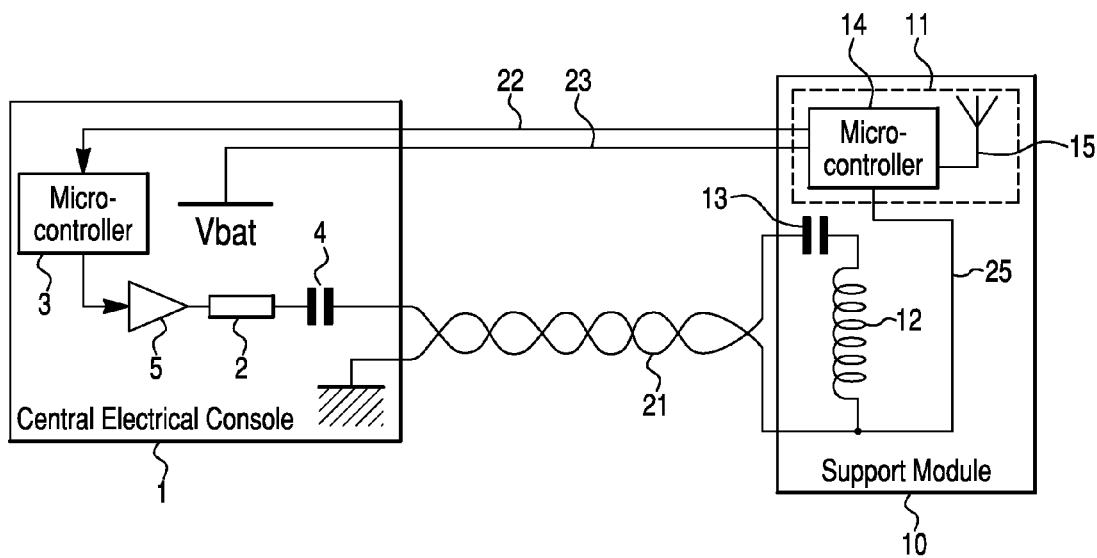
FIG. 2 is a schematic diagram of an identification device according to a first embodiment of the invention.

However, according to the invention, the tuning capacitor 13 is fitted in the support module 10 rather than in the central console 1.

Consequently, the tension carried by the electrical link 21 between the central console 1 and the support module 10 is only about ten Volts, so it generates much less parasitic radiation.

The tension is high only on the link between the tuning capacitor 13 and the coil 12, but the field generated is negligible since the tuning capacitor 13 and the coil 12 are juxtaposed on the electronic board of the support module.

Consequently, thanks to the invention, it is possible to use an unscreened, inexpensive twisted cable 21 to connect the central console 1 and the support module 10, bringing advantages in terms of cost and space of the electrical links in the vehicle.

Advantageously, an adjusting capacitor 4 of a few tens of picoFarads is mounted downstream of the resistor 2. This adjusting capacitor 4 provides for fine tuning of the resonance frequency, to take account of the geometry of the vehicle in which the identification device is installed, given that the generated magnetic field is affected by the quantity and proximity of bodywork metal and the vehicle handle.

This adjusting capacitor has a low capacitance such that its output tension is only about ten Volts, so despite the presence of this adjusting capacitor 4 the twisted cable 21 does not need to be screened.

Consequently, the fitting of the identification device is easier since the adjustment of the resonance frequency is made only once in the central console for all the doors.

Moreover, the same identification device can be easily fitted on different types of vehicle. The operating frequency of the device is then adjusted for each type of vehicle to take account of its geometry and the required resonance frequency. Thanks to the use of this adjusting capacitor, it becomes much easier to standardize identification devices.

A secondary advantage of the adjusting capacitor is that provides protection against short-circuits.

Moreover, as seen in FIG. 1, the approach sensor 11, mounted in the support module, comprises one or more electrodes 15 and a microcontroller 14 for processing and sending a triggering signal.

This processing microcontroller 14 is connected to the central console 1 by three electrical links: a link to ground 24, a link to the power supply 23 and a transmission link 22 for a triggering signal to the microcontroller 3 verifying the identification data.

Advantageously, according to the invention, the ground of the processing microcontroller 14 is connected by a wire 25 to the ground wire of twisted cable 21. In this manner, the approach sensor 11 and the transmission/reception coil 12 use the same ground link, which therefore reduces the number of wires between the central console 1 and the support module 10.

Figure 3:
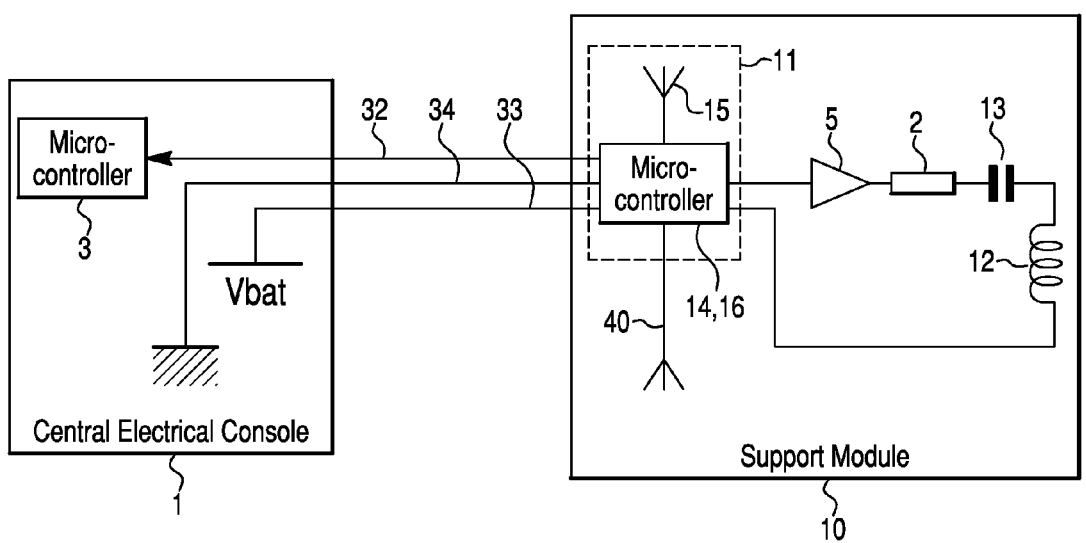
FIG. 3 is a schematic diagram of an identification device according to a second embodiment of the invention.

A second embodiment of the invention is shown in FIG. 3. In this embodiment, the amplifier stage 5 and the resistor 2 have been fitted in the support module 10, in series with the tuning capacitor 13 and the transmission/reception coil 12.

Moreover, an additional microcontroller 16 manages the processing and sending and/or reception of the identification data emitted and/or received by the coil 12.

Consequently, the electrical link 21 for transmission of the identification data between the console 1 and the support module 10 is eliminated, which saves space and reduces the cost.

Moreover, the data transmission link 32 connecting the additional microcontroller 16 to the verification microcontroller 3 carries no alternating signal, so it does not need to be twisted, which also saves space and money.

In this case, the additional microcontroller 16 manages the transmission of the identification data. However, it would also be possible for the additional microcontroller 16 to generate the identification data and send it both to the amplifier stage 5 and to the verification microcontroller 3. In this case, the identification data emitted by the badge are still authenticated by the verification microcontroller 3 which authorizes unlocking of the opening.

In a variant of the invention, the processing microcontroller 14 of the approach sensor replaces the additional microcontroller.

In this variant, the processing microcontroller 14 advantageously processes the triggering signal and manages at the same time, by means of multiplexing, the sending and/or receiving of the triggering signal and the identification data on a single transmission link 32.

Advantageously, the support module 10 also includes door closing control means, such as a tactile sensor or a manually operated switch.

A tactile sensor generally comprises an electrode 40 and a microcontroller that processes and sends a door locking signal.

According to the invention, the processing microcontroller 14 of the approach sensor 11 advantageously also manages the processing and sending and/or reception of a locking signal on the transmission link 32.

Moreover, according to the invention, a power supply link 33 connects the central console 1 to the processing microcontroller 14. This power supply 33 feeds the closing control means and the approach sensor 11.

Also advantageously, a ground link 34 connects the central console 1 to the processing microcontroller 14. This ground 34 provides the ground for the transmission/reception coil 12, the approach sensor 11 and the closing control means.

In this manner, a single power supply 33, a single ground 34 and a single data transmission link 32 connect the central console 1 and each support module 10.

The connections to ground and to the battery can also be via an electrical harness of the vehicle and serve each of the electronic components of the vehicle individually. In this case, the variants of the invention described above are also feasible.

Consequently, the invention considerably reduces the size of the electrical links.

Moreover, the number of electrical connections is reduced, which increases the reliability of the identification device, since electrical connections are a common cause of faults.

In addition, the support module can be easily mounted to ensure maximum comfort for the user.

The invention claimed is:

1. Device for identifying an automobile vehicle, comprising:
   an identification unit carried by a user;
   a central onboard console (1) for verifying a user's identification data via electromagnetic wave communication through a resonant circuit (2, 12, 13) having at least one tuning capacitor (13) and at least one transmission/reception coil (12) transmitting/receiving said identification data; and
   at least one support module (10) comprising said transmission/reception coil (12) and fitted at a vehicle door;
   said central onboard console (1) being located in a passenger compartment of the vehicle in a location spaced from said vehicle door;
   said support module (10) and said central onboard console (1) being spaced apart from each other and connected by electrical connection means (20-24; 32-34), wherein said resonant circuit tuning capacitor (13) is fitted together with said transmission/reception coil (12) on an electronic board in said support module (10) to limit parasitic radiation from said resonant circuit.

2. The identification device according to claim 1, wherein said resonant circuit includes an adjusting capacitor (4), fitted in said central onboard console (1), used for fine adjustment of the resonant circuit resonance frequency, to be able to take account of the geometry of each type of vehicle.

3. A device for identifying an automobile vehicle, comprising:
   an identification unit carried by a user;
   a central onboard console (1) for verifying a user's identification data via electromagnetic wave communication through a resonant circuit (2, 12, 13) having at least one tuning capacitor (13) and at least one transmission/reception coil (12) transmitting/receiving said identification data; and
   at least one support module (10) comprising said transmission/reception coil (12) and fitted at a vehicle door;
   said central onboard console (1) being located in a passenger compartment of the vehicle in a location spaced from said vehicle door;
   said support module (10) and said central onboard console (1) being spaced apart from each other and connected by electrical connection means (20-24; 32-34), wherein said resonant circuit tuning capacitor (13) is fitted together with said transmission/reception coil (12) on an electronic board in said support module (10) to limit parasitic radiation from said resonant circuit,
   wherein said central onboard console (1) includes a verification microcontroller (3) to verify said identification data, and wherein said support module (10) includes an additional microcontroller (14), an amplifier stage (5) and said resonant circuit (2, 12, 13) connected together in series, said additional microcontroller (14) being connected to said verification microcontroller (3) to manage the sending of said identification data, by multiplexing on a common serial link (32), thereby reducing the number of wires between said support module (10) and said central onboard console (1).

4. A device for identifying an automobile vehicle, comprising:
   an identification unit carried by a user;
   a central onboard console (1) for verifying a user's identification data via electromagnetic wave communication through a resonant circuit (2, 12, 13) having at least one tuning capacitor (13) and at least one transmission/reception coil (12) transmitting/receiving said identification data; and
   at least one support module (10) comprising said transmission/reception coil (12) and fitted at a vehicle door;
   said central onboard console (1) being located in a passenger compartment of the vehicle in a location spaced from said vehicle door;
   said support module (10) and said central onboard console (1) being spaced apart from each other and connected by electrical connection means (20-24; 32-34), wherein said resonant circuit tuning capacitor (13) is fitted together with said transmission/reception coil (12) on an electronic board in said support module (10) to limit parasitic radiation from said resonant circuit,
   wherein said central onboard console (1) includes a verification microcontroller (3) to verify said identification data, and wherein said support module (10) includes an approach sensor (11) and an amplifier stage (5) connected to said resonant circuit (2, 12, 13), said approach sensor (11) comprising at least one electrode (15) and a processing microcontroller (14) that sends a triggering signal to said verification microcontroller, said processing microcontroller (14) being connected to said verification microcontroller (3) to also manage the sending of said identification data, by multiplexing on a common serial link (32), thereby reducing the number of wires between said support module (10) and said central onboard console (1).

5. The identification device according to claim 4, wherein at least one closing control means (14, 40), acting on a vehicle door, is fitted on said support module (10), said control means comprising at least one electrode (40) and a processing microcontroller that processes and sends a door locking command signal.

6. The identification device according to claim 5, wherein said additional microcontroller or said processing microcontroller (14) that sends a triggering signal is connected to said electrode (40) to also manage the sending of a locking command signal, by multiplexing on said common serial link (32), thereby reducing the number of wires between said support module (10) and said central onboard console (1).

7. The identification device according to claim 5, wherein said closing control means (40, 14) is a tactile sensor.

8. The identification device according to claim 5, wherein said closing control means (40, 14) includes a manually operated switch.

9. The identification device according to claim 3, wherein said support module (10) and said central onboard console (1) are connected by only one ground link (34) providing the ground for all the electronic components (40, 12, 11) in said module (10), thereby reducing the number of wires between said support module (10) and said central onboard console (1).

10. The identification device according to claim 5, said support module (10) and said central onboard console (1) are connected by only one power supply link providing the power supply for all the electronic components (40, 11) in said module (10), thereby reducing the number of wires between said support module (10) and said central onboard console (1).

11. The identification device according to claim 3, wherein at least one closing control means (14, 40), acting on a vehicle door, is fitted on said support module (10), said control means comprising at least one electrode (40) and a processing microcontroller that processes and sends a door locking command signal.

12. The identification device according to claim 11, wherein said additional microcontroller or said processing microcontroller (14) that sends a triggering signal is connected to said electrode (40) to also manage the sending of a locking command signal, by multiplexing on said common serial link (32), thereby reducing the number of wires between said support module (10) and said central onboard console (1).

13. The identification device according to claim 12, wherein said closing control means (40, 14) is a tactile sensor.

14. The identification device according to claim 12, wherein said closing control means (40, 14) includes a manually operated switch.

15. The identification device according to claim 11, said support module (10) and said central onboard console (1) are connected by only one power supply link providing the power supply for all the electronic components (40, 11) in said module (10), thereby reducing the number of wires between said support module (10) and said central onboard console (1).

16. The identification device according to claim 11, further comprising an adjusting capacitor (4) mounted downstream of a resistor (2) in said central onboard console (1) for fine tuning of a resonance frequency whereby said adjusting capacitor (4) takes into account geometry of said vehicle and for protection against short-circuit.

* * * * *